(12) United States Patent
Kanke et al.

(10) Patent No.: US 6,752,014 B1
(45) Date of Patent: Jun. 22, 2004

(54) HOT-WIRE TYPE AIR FLOW METER FOR INTERNAL COMBUSTION ENGINE

(75) Inventors: Atsushi Kanke, Hitachi (JP);
Masamichi Yamada, Hitachinaka (JP);
Keiichi Nakada, Hitachinaka (JP);
Izumi Watanabe, Hitachinaka (JP);
Hisao Sonobe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/653,168

(22) Filed: Sep. 1, 2000

(30) Foreign Application Priority Data

Sep. 24, 1999 (JP) ............................................ 11-270385

(51) Int. Cl.[7] ................................................. G01F 1/68
(52) U.S. Cl. ................................................. 73/204.15
(58) Field of Search ........................ 73/204.15, 204.27, 73/204.26, 204.25, 204.18, 18.2, 118.2; 123/494, 488, 492

(56) References Cited

U.S. PATENT DOCUMENTS 4,829,814 A * 5/1989 Suzuki et al. ............... 73/118.2
4,870,860 A 10/1989 Ohta et al.
5,355,723 A 10/1994 Gmelin et al.

FOREIGN PATENT DOCUMENTS

JP A-61-102522 10/1986
JP B-5-7659 1/1993
JP A-5-264312 10/1993

OTHER PUBLICATIONS

*Patent Abstracts of Japan*, vol. 004, No. 110 (P–022); abstract of JP 55–066715 (Aug. 1980).
*Patent Abstracts of Japan*, vol. 014, No. 434 (P–1107); abstract of JP 02–170015 (Sept. 1990).
*Patent Abstracts of Japan*, vol. 010, No. 334 (P–515); abstract of JP 61–139722 (Nov. 1986).

* cited by examiner

*Primary Examiner*—Harshad Patel
(74) *Attorney, Agent, or Firm*—Crowell & Moring LLP

(57) ABSTRACT

A hot-wire type air flow meter for an internal combustion engine has an exothermic resistor film provided on a thin portion formed on a silicon substrate and a control circuit for controlling a voltage to be applied to the resistor film or a current to be supplied. The resistor film is arranged in a suction pipe of the internal combustion engine and heat is emitted to an air through the resistor film. In the case where a liquid droplet is deposited onto the resistor film, the control circuit controls the applied voltage to a value smaller than a voltage which is applied to the resistor film at the time of measuring a maximum specified measuring range or controls the supply current to a value smaller than a current flowing in the resistor film at the time of measuring the maximum specified measuring range.

33 Claims, 12 Drawing Sheets

HOT-WIRE TYPE AIR FLOW METER FOR INTERNAL COMBUSTION ENGINE

BACKGROUND OF THE INVENTION

1. Field of the Invention

The invention relates to a measuring apparatus of an air flow rate and, more particularly, to a hot-wire type air flow meter (heat flow meter) suitable for detection of a suction air flow rate of an internal combustion engine.

2. Description of Related Art

Hitherto, as an air flow rate measuring apparatus which is provided for an electronic control type fuel injection apparatus of an internal combustion engine such as an automobile or the like and measures a suction air flow rate, a number of hot-wire type apparatuses have been used because a mass air flow rate can be directly detected. In this instance, to assure a reliability of an exothermic resistor, a sensor having a certain extent of heat capacity which is constructed by winding a platinum wire around a bobbin and coating it with glass, forming a thin film resistor onto a ceramic substrate, or the like is often used. In a sensor having a large heat capacity, although a system such that a current is limited when a waterdrop is deposited onto a portion other than an internal combustion engine has been shown in JP-A-5-264312, a power voltage is large to be 24V and a measuring region of a rated value or more is limited. Such a system is used, particularly, for measurement of a flow rate of the compressed air and there is a problem that although a waterdrop is instantaneously evaporated usually at 100° C. at an atmospheric pressure, in the compressed air, an evaporation temperature of the water is high, it takes time to evaporate the waterdrop, and an excessive current flows in an exothermic portion. In this instance, since the power voltage is high to be 24V, when a waterdrop is deposited, a current which is one or more digits larger than a rated current flows, and accordingly, it is limited by a current limiter. In an internal combustion engine, to prevent a fusion of a hot wire, a system for reducing an applied voltage to a bridge by detecting a voltage across a hot wire resistor has been disclosed in JP-A-61-102522 or the like. According to such a system, to prevent the fusion due to the supply of the abnormal voltage because of noises or the like, a voltage limit value larger than the maximum value at the time of the stationary operation is set.

As a flow meter having a high response speed, a number of flow meters in which an exothermic resistor of a small heat capacity is attached on a silicon substrate have been proposed. For example, as shown in JP-B-5-7659, a thin film is formed on a silicon semiconductor substrate and a flow rate is detected by a thermal sensor.

SUMMARY OF THE INVENTION

In the conventional techniques mentioned above, in case of using an exothermic resistor of a large heat capacity, a response speed at the time of a power-on of an air flow rate measuring apparatus is determined only from the relation between a power source voltage and the heat capacity of the exothermic resistor. In an internal combustion engine such as an ordinary gasoline engine or the like, therefore, since a power source voltage is usually small to be about 12V, an operating current to the exothermic resistor is limited and it takes time to heat, so that it is difficult to accurately measure an air flow rate for a predetermined time at the start of an engine of an automobile or the like.

To improve the response speed, it is necessary to use an exothermic resistor of a small heat capacity. In a hot-wire air flow meter, however, the maximum flow rate which can be measured is limited unconditionally to a certain degree by the heat capacity and a heating temperature of the exothermic resistor which is used for measurement and by a power source voltage which can be applied. It is because when the heat capacity is small, if it is intended to raise a measuring sensitivity (maximum flow rate) of the flow rate by increasing the heating temperature, a limitation such that the exothermic resistor deteriorates when the heating temperature is equal to or higher than a predetermined value occurs. For example, a system such that an exothermic resistor is constructed by forming a thin film with a diaphragm structure onto a silicon substrate and a temperature of the exothermic resistor is controlled so as to become a constant temperature by a feedback circuit by using a bridge circuit or the like has the highest response speed. If a waterdrop, an oil droplet, or the like is deposited onto the exothermic resistor portion, however, a heating balance is broken and a voltage is applied so that the heating temperature of the exothermic resistor locally rises. Even in case of the applied voltage which does not cause a problem in the ordinary operation, therefore, if the temperature elevation continues, there is a possibility that the resistor of a small heat capacity constructed by the thin film is deteriorated by the heat and, in the worst case, the diaphragm is broken by a thermal stress.

Although the excessive temperature elevation can be prevented by limiting the voltage applied to the hot-wire type resistor so as not to locally raise the heating temperature of the exothermic resistor, there is a problem that a measuring range of the inherent flow rate is also narrowed.

It is, therefore, an object of the invention to provide a hot-wire type air flow meter for an internal combustion engine which can solve the problems of the conventional techniques mentioned above.

According to an aspect of the invention, there are provided: means for detecting a heating state of an exothermic resistor by distinguishing a case where a waterdrop, an oil droplet, or the like is deposited onto the exothermic resistor portion from a normal case where there is no deposition; and circuit means for limiting a heating time by the detected heating state. Thus, only in the case where the waterdrop, oil droplet, or the like is deposited onto the exothermic resistor portion, the heating state is limited without narrowing a measuring range of an inherent flow rate and a deterioration of the resistor can be prevented.

BRIEF DESCRIPTION OF THE DRAWINGS

FIGS. 4A to 4D are comparison diagrams of the voltage limiting operations of a bridge voltage at the time of power-on;

FIGS. 10A to 10F are comparison diagrams of the voltage limiting operations of a bridge voltage at the time of power-on;

DETAILED DESCRIPTION OF THE EMBODIMENTS

Figure 1:
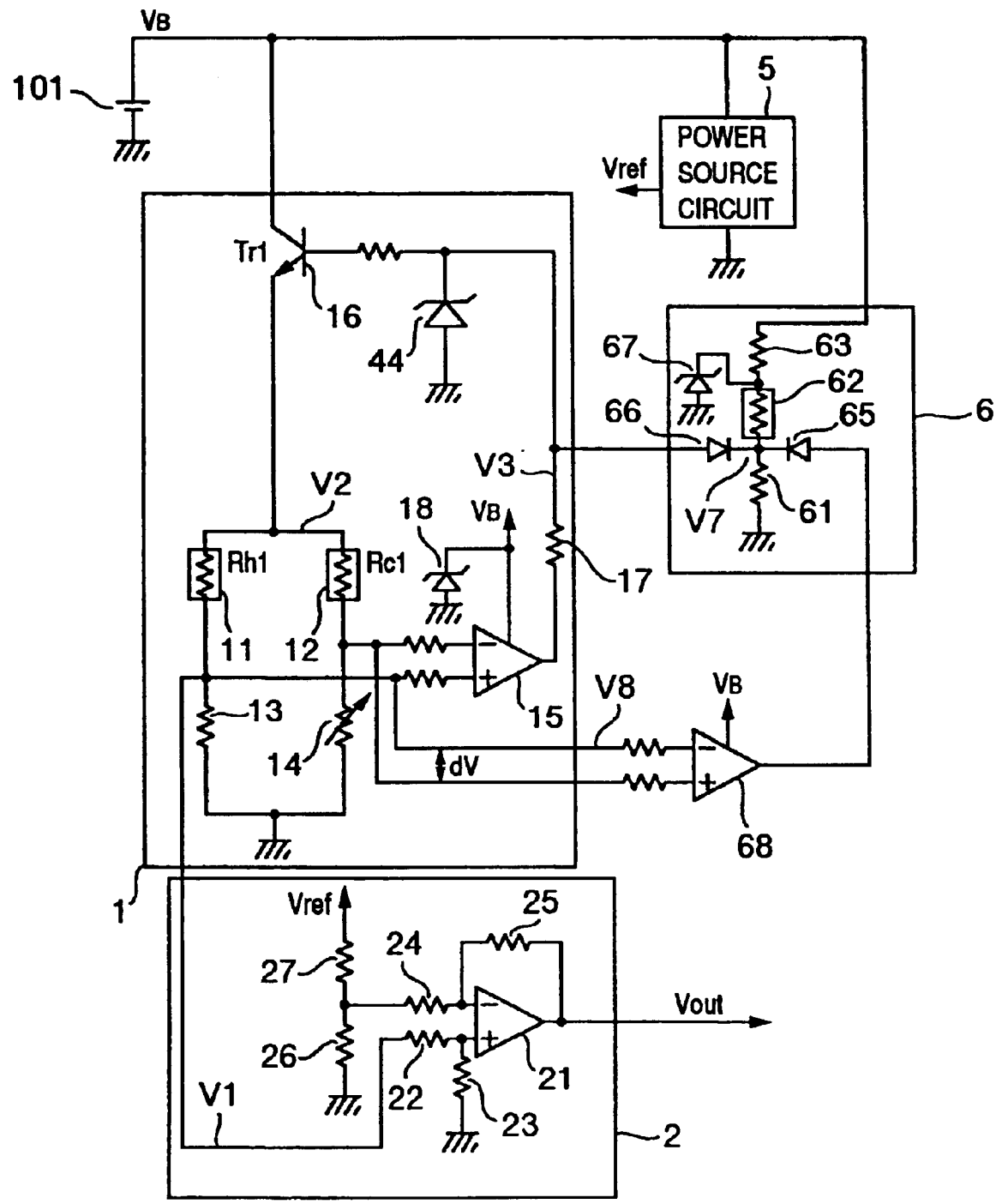
FIG. 1 is a circuit diagram showing an example of a hot-wire type flow meter according to the first embodiment of the invention.

An embodiment of a hot-wire type air flow meter for an internal combustion engine according to the invention will be described in detail hereinbelow. In the following drawings, component elements having the same or similar functions are designated by the same reference numerals.

An example of a construction of a hot-wire type air flow meter according to the first embodiment of the invention will be described hereinbelow with reference to FIG. 1. A hot wire driving circuit I is connected to a power source 101 and generates a signal corresponding to an air flow rate. A hoisten-bridge circuit is constructed by: an exothermic resistor 11; a temperature compensation resistor (a resistor for measuring a suction air temperature, a temperature detecting element of a fluid, a temperature sensor of an air and a medium, a fluid temperature sensing unit, a temperature dependent resistor) 12 as a resistor whose resistance value varies in accordance with an ambient air temperature; and resistors 13 and 14. The hot wire driving circuit 1 is constructed in such a manner that a current flowing in the exothermic resistor 11 is adjusted by a differential amplifier 15 and a transistor 16 so that a potential difference at a middle point of a bridge is equal to zero by the hoisten-bridge circuit. When a heating temperature of the exothermic resistor 11 is low, an output of the differential amplifier 15 is large and the resistor 11 operates so as to heat more. With this construction, the resistance value of the exothermic resistor 11 is controlled so as to be constant irrespective of an air flow rate, namely, in a manner such that the temperature is set to a predetermined value. In this instance, a signal corresponding to an air flow rate due to the exothermic resistor 11 is inputted to a zero span circuit 2. The zero span circuit 2 is constructed by a differential amplifier 21 and resistors 22, 23, 24, 25, 26, and 27.

The exothermic resistor 11 can be constructed by, for example, a thin or thick film of platinum or tungsten as an exothermic body onto a plate-shaped glass or ceramic substrate. It is, however, necessary to design it so as to have a small heat capacity.

Particularly, to reduce the heat capacity and raise a response speed, it is desirable to construct the exothermic resistor 11 in such a manner that a thin or thick film of platinum or tungsten, a polysilicon resistor, or a resistor of monocrystal silicon is formed as an exothermic body onto a thin portion of a semiconductor substrate of silicon or the like.

The exothermic resistor 11 is provided in a suction passage of an internal combustion engine of an automobile or the like and a voltage output corresponding to a flow rate of the air flowing in the suction passage is obtained as an output of the differential amplifier 21. An ordinary hot-wire type air flow meter is constructed as mentioned above.

Figure 2A:
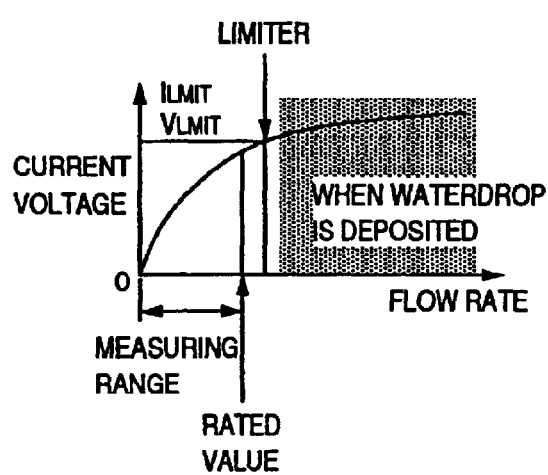
FIGS. 2A and 2B are diagrams each showing the limiting operation at the time when a waterdrop is deposited and a flow rate measuring range.

A measuring range of the air flow rate in case of preventing a deterioration, breakage, or the like of the resistor due to overheating will now be described with reference to FIG. 2A. This diagram shows the relation between the flow rate and a voltage (or current) which is applied to the exothermic resistor due to an increase in flow rate. An output according to the flow rate becomes an output of the hot-wire type air flow meter. Now, considering an operating state at the time when a waterdrop is deposited, it is necessary to limit the voltage to a value which is equal to or less than a voltage (or current) at which a deterioration, breakage, or the like is caused in the resistor by the deposition of the waterdrop. A limiter limits the voltage to a value which is equal to or less than such a voltage. In this case, by limiting the voltage by the limiter, a specified measuring range of the air flow rate is simultaneously, limited. Particularly, in case of using an exothermic resistor of a small heat capacity constructed by forming a thin film onto a silicon semiconductor substrate, since the voltage (or current) at which a deterioration, breakage, or the like is caused in the resistor by the deposition of the waterdrop drops, there is a tendency such that the measuring range is narrowed.

Figure 2B:
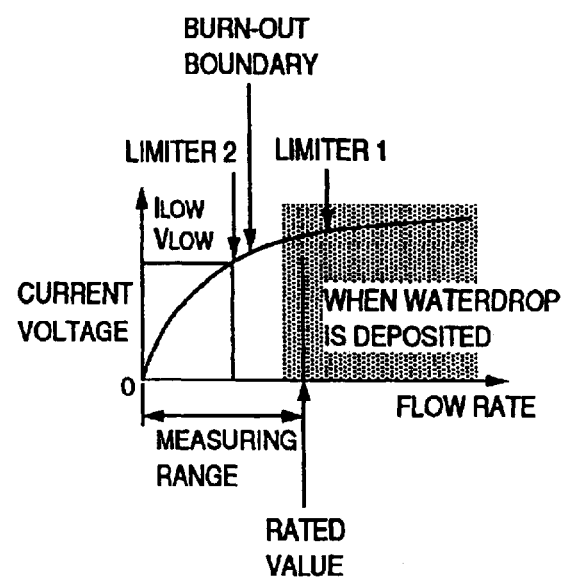

On the other hand, to widen the measuring range to the voltage (or current) at which a deterioration, breakage, or the like is caused in the resistor by the deposition of the waterdrop, it is possible to cope with such a purpose by detecting a depositing state of the waterdrop and limiting the voltage (or current) in accordance with the presence or absence of the waterdrop. FIG. 2B shows a measuring range of the air flow rate in this instance. Particularly, in case of using an exothermic resistor of a small heat capacity constructed by forming a thin film onto a silicon semiconductor substrate, to widen the measuring range to the voltage (or current) at which a deterioration, breakage, or the like is caused 64 in the resistor by the deposition of the waterdrop, it is necessary to increase a rated value and set a limiting condition (first limiter) such as a voltage (or current) or the like to a rated value (maximum specified measuring range) or more. In this state, however, since a breakage or the like is caused at the time of deposition of a waterdrop, second limiting means for limiting the voltage to a value which is equal to or less than a rated value at which a breakage or the like is not caused by the voltage (or current) when a deposition of a waterdrop is detected is provided. Particularly, as a level of the second limiter, it is especially effective to set the voltage to a level so as not to cause a state called "burn-out" such that when a waterdrop is deposited, an air layer is formed on the surface of the exothermic resistor and overheating occurs.

As shown in FIG. 1, in the embodiment, a Zener diode 44 is provided as a first limiter for limiting the voltage within the measuring range of the flow rate or more. The Zener diode limits the voltage when a battery voltage of the power source 101 rises, and it does not operate ordinarily.

Figure 3:
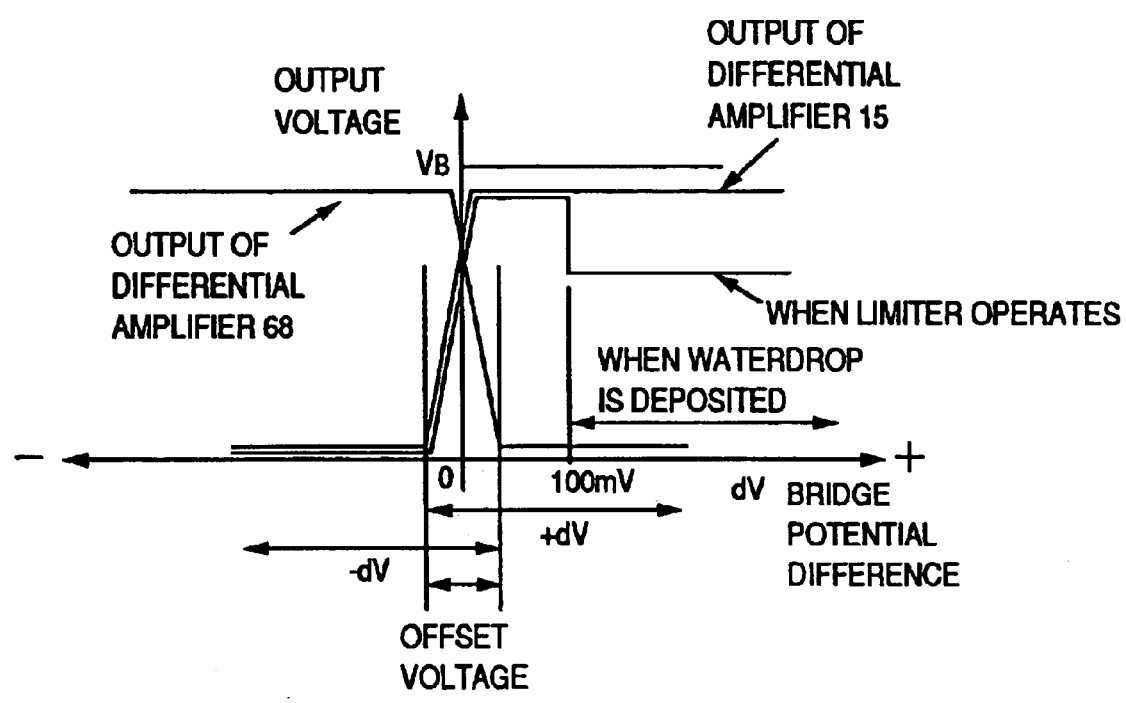
FIG. 3 is a diagram showing output voltage characteristics of a bridge potential difference and a differential amplifier.

In this instance, particularly, a differential amplifier 68 is prepared as second bridge detecting means for detecting a potential difference at a middle point of the bridge in order to detect the depositing state of the waterdrop, and a voltage limitation switching circuit 6 is provided as a second limiter for limiting an output voltage V3 of the differential amplifier 15 in accordance with a detection result. FIG. 3 shows characteristics of the bridge potential difference and the output voltage of the differential amplifier as input/output characteristics of the bridge circuit.

Usually, the current flowing in the exothermic resistor 11 is adjusted by the differential amplifier 15 and transistor 16 so that an output (potential difference at the middle point of the bridge) of the bridge circuit is equal to zero. It is because the voltage which is applied to the bridge circuit is controlled within a range from 0 to the power source voltage by a feedback in accordance with the potential difference at the middle point of the bridge. When the potential difference input at the middle point of the bridge is equal to or larger (or smaller) than a predetermined value, the output of the differential amplifier 15 is limited to the power source voltage or grounding level.

In the ordinary operation, since there is an output sensitivity only for the potential difference (+dV) of the bridge on the plus side, it is difficult to distinguish the bridge potential difference (+dV) when the waterdrop is deposited from the bridge potential difference (+dV) which is temporarily generated at the time of the maximum flow rate. Therefore, attention is paid to the fact that a large bridge voltage is continuously generated when the waterdrop is deposited, and the output voltage is limited by the limiter only in this case.

Since it is actually difficult to limit the output voltage only by the differential amplifier 15, the differential amplifier 68 is added and used as a detector of the waterdrop and as a limiter. Specifically speaking, the differential amplifier 68 is constructed in such a manner that a polarity of the potential difference at the middle point of the bridge is changed and (−dV) is inputted, namely, the potential difference at the middle point of the bridge is changed to the opposite polarity and (−dV) is inputted, when the large bridge potential difference (+dV) is continuously generated, the output of the differential amplifier 68 is set to the grounding level and the second limiter is made operative, and the second limiter is made inoperative in the other cases. Since there is generally an offset voltage in the input of the differential amplifier, a partial region of the bridge potential difference crosses.

As mentioned above, for the ordinary control voltage range (only from 0V to the power source voltage and the plus side) of the voltage to be applied to the bridge circuit, the potential difference at the middle point of the bridge is outputted as a differential amount between the plus side and the minus side. Therefore, the polarities on the plus side and the minus side of the potential difference at the middle point of the bridge are shared by the two differential amplifiers 15 and 68 and such a potential difference is separately inputted and fed back to the voltage which is applied to the bridge circuit. Consequently, if a state where the potential difference at the middle point of four resistors constructing the bridge circuit is equal to, for example, 100 mV or more or 100 mV or less continues, it is possible to determine that such a state is a certain specific state (for example, waterdrop depositing state).

The voltage limitation switching circuit 6 is constructed by: resistors 61, 62, and 63 connected serially between a battery voltage VB of the power source 101 and the ground; a Zener diode 67 connected to a node of the resistors 62 and 63; diodes 65 and 66 connected to a node of the resistors 61 and 62; and the like. The voltage limitation switching circuit 6 limits the output of the differential amplifier 15 to a voltage V7 which is set by the Zener diode 67 through a resistor 17, the diode 66, and the resistor 62. If a resistor having a temperature coefficient which is equal to or larger than that of the temperature compensation resistor 12 is used as a resistor 62 and arranged in a suction pipe, the temperature characteristic can be also provided at the voltage V7 which is set by the Zener diode 67.

An example will now be specifically described. In the case where the exothermic resistor 11 is controlled, at a constant temperature in the ordinary operation, a potential difference dV at the middle point of the bridge approaches zero. Assuming that the offset voltage of the differential amplifier 15 is equal to plus several mV, dV is stabilized at a level of minus several mV. Even in the case where the flow rate increases and potential difference dV slightly increases, by rapidly increasing the heating current of the exothermic resistor 11 on the basis of the output of the differential amplifier 15 and always making the constant temperature control, the potential difference dV at the middle point of the bridge is held at the level of minus several mV near zero. In this instance, assuming that the potential difference dV at the middle point of the bridge is held at the level of minus several mV, the output of the differential amplifier 68 to detect the depositing state of the waterdrop is set to the high level. Assuming that both of the differential amplifier 15 and differential amplifier 68 are connected to the power source 101 by similar circuit constructions, an output V3 of the differential amplifier 15 is not subjected to the voltage limitation by the operations of the diodes 65 and 66 of the voltage limitation switching circuit 6. On the other hand, when a waterdrop is deposited, since the heating temperature of the exothermic resistor 11 does not rise, the large potential difference dV at the middle point of the bridge of plus hundreds of mV is generated. When this state is detected, the output of the differential amplifier 68 is set to the low level. The output V3 of the differential amplifier 15 is subjected to the voltage limitation by the voltage V7 set by the resistors 61, 62, and 63 and Zener diode 67 by the operation of the voltage limitation switching circuit 6.

Figure 4A:
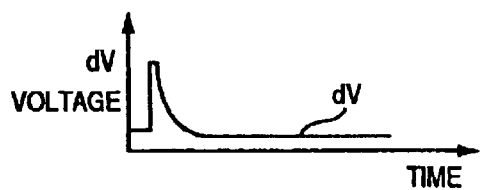
Figure 4C:
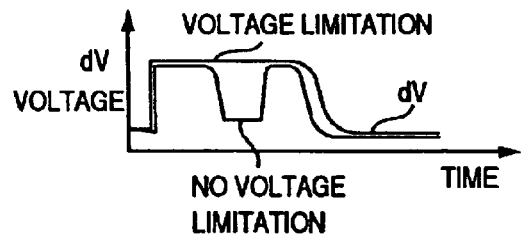
Figure 4B:
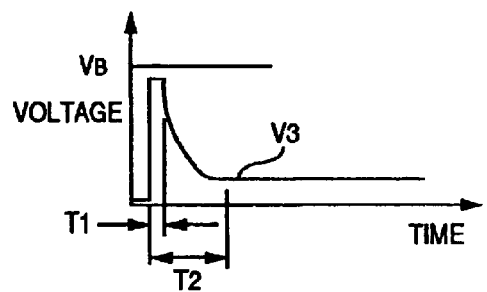

Subsequently, the details of the voltage limiting operation using the voltage limitation switching circuit 6 will be described with reference to FIGS. 4A to 4D. FIGS. 4A and 4B show the operations of the potential difference dV at the middle point of the bridge and the output V3 of the differential amplifier 15 in the normal operation, respectively. The output V3 of the differential amplifier 15 becomes maximum and the potential difference dV also increases for a time T1 during which the exothermic resistor 11 is heated upon activation. After that, when the initial heating is finished, the stable constant temperature control operation is performed after the elapse of a time T2, the potential difference dV decreases, and the output V3 of the differential amplifier 15 is stabilized to a predetermined voltage according to the flow rate. For example, in case of the exothermic resistor of the small heat capacity constructed by forming the thin film onto the silicon semiconductor substrate, the time T2 which is required until the control operation is stabilized after the end of the initial heating can be set to a short time within a range from several msec to tens of msec in accordance with the heat capacity.

Figure 4D:
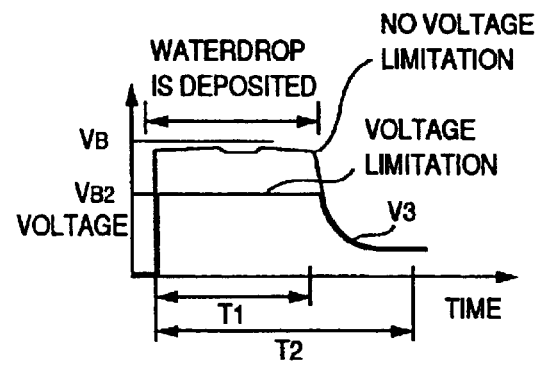

In the voltage limiting operation in FIGS. 4C and 4D, a difference due to the presence or absence of the voltage limiting operation when a waterdrop is deposited according to the embodiment will be described. First, a case of no voltage limitation will be explained. When a waterdrop is deposited, the output V3 of the differential amplifier 15 becomes the maximum voltage upon activation and its state is almost maintained although there is a slight fluctuation until the water is evaporated and the ordinary operation is performed (refer to FIG. 4D). For this period of time, although the potential difference dV at the middle point of the bridge increases upon activation, the unstable operation such that it is decreased and increased is repeated after that (refer to FIG. 4C). It is because if the voltage applied to the bridge is large, when a waterdrop is deposited, an air layer is partially formed on the surface of the exothermic resistor and a state called "burn-out" corresponding to overheating occurs. The exothermic resistor repeats the quenching by the waterdrop and the partial high temperature heating state by the air layer. The potential difference dV at the middle point of the bridge also repetitively increases and decreases in accordance with the heating state of the exothermic resistor. The reason why the potential difference dV increases and decreases is because the heating temperature rises due to the formation of the air layer and such a state is temporarily recognized as an ordinary balanced control situation of the bridge. In this state, if the potential difference dV at the middle point of the bridge is merely checked, the depositing state of the waterdrop cannot be discriminated. If the temperature continuously rises, the resistor of the small heat capacity formed by the thin film is deteriorated by the heat or the breakage of the diaphragm cannot be prevented due to the heat stress.

On the other hand, a case where there is a voltage limitation will be described. When the waterdrop is deposited, if the potential difference dV at the middle point of the bridge is large, the output V3 of the differential amplifier 15 is limited by the voltage limitation switching circuit 6. That is, when the waterdrop is deposited, the bridge applied voltage is limited to a predetermined value or less so that an electric power can be limited to a predetermined power corresponding to the area of the exothermic resistor or less so as not to cause a state called "burn-out" indicative of an overheating in which the air layer is formed on the surface of the exothermic resistor. Thus, if the state where the potential difference dV at the middle point of the bridge is large continues and there is no waterdrop, the potential difference dV decreases and the voltage limitation is cancelled. Therefore, by limiting the bridge applied voltage in accordance with the potential difference dV upon activation and monitoring the magnitude of the potential difference dV, the depositing state of the waterdrop can be discriminated. If the predetermined voltage or more is applied even in a state where the output V3 of the differential amplifier 15 is limited to VB2, the waterdrop can be evaporated after the elapse of the predetermined time T1. Even if there is the waterdrop, the deterioration or breakage of the exothermic resistor can be prevented and, at the same time, by eliminating the waterdrop, the operation can be certainly returned to the stable constant temperature control operation after the elapse of the time T2. The duration of the time T2 varies depending on the depositing state or amount of waterdrop. It is sufficient to set a predetermined electric power level according to the area of the exothermic resistor to a voltage (or current) at which it can be limited to a value of a heat flux of, for example, $4 \times 10^5$ W/m$^2$ or less so as not to cause the state called "burn-out" mentioned above.

Figure 5:
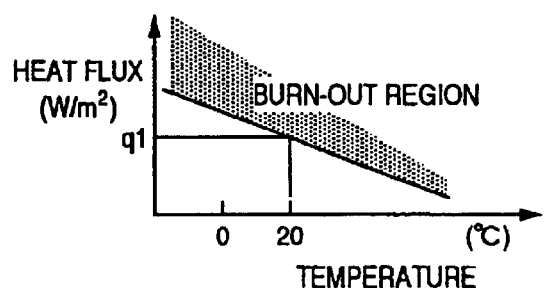
FIG. 5 is a diagram showing a burn-out region according to a temperature and a hot flow rate.
Figure 6A:
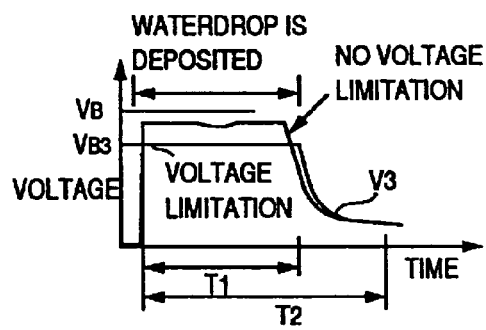
FIGS. 6A and 6B are comparison diagrams of the voltage limiting operations of the bridge voltage at the time of power-on in the case where it has a temperature characteristic.
Figure 6B:
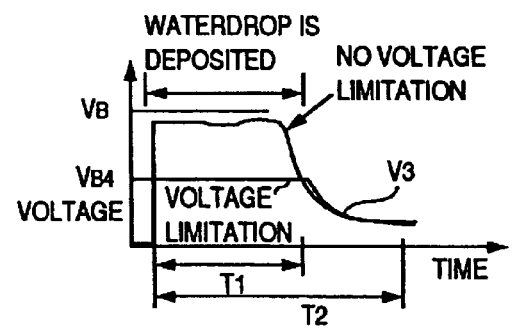

The operation in the case where the initial temperature of the deposited waterdrop varies depending on the ambient temperature will now be described. FIG. 5 shows a state where in the case where the front surface of the exothermic resistor is covered by a waterdrop, the higher the temperature of the waterdrop (regarded in a manner similar to the suction temperature) is, the smaller the value of the heat flux causing the burn-out is. In other words, it means that when the temperature is high, even if the electric power which is applied to the exothermic resistor is small, the burn-out more easily occurs. Therefore, by using the resistor having the temperature characteristic as a resistor 62 in FIG. 1 as shown in FIGS. 6A and 6B, the limiting voltage can be also varied in accordance with the suction temperature. In this case, when the suction temperature in FIG. 6A is low, a limiting voltage VB3 is increased (a difference between the limiting voltage and the voltage at the time of no limitation is small). In this case, when the suction temperature in FIG. 6B is high, a limiting voltage VB4 is decreased (the difference between the limiting voltage and the voltage at the time of no limitation is large). By this method, the deterioration or breakage of the resistor due to the burn-out or the like in various modes can be prevented.

Even if the fuel flows at the maximum flow rate and the heating temperature of the exothermic resistor decreases, the potential difference dV instantaneously increases and the bridge applied voltage is limited. However, since the heating temperature is soon recovered in the ordinary air, the potential difference dV decreases and the limitation of the bridge applied voltage is soon eliminated. Therefore, there is no practical problem.

According to the embodiment, particularly, by detecting the depositing state of the waterdrop and limiting the applied voltage, there are effects such that the deterioration of the reliability such as deterioration or breakage of the exothermic resistor can be prevented and the measuring range of the flow rate can be widened. Although the circuit is not particularly shown in the diagram, even in case of using a circuit construction such that a plurality of bridge circuits of the exothermic resistor are provided and a reverse current can be detected, it is sufficient to add a voltage limiting circuit of the invention every bridge circuit. Similarly, even in case of using an indirect-heated type construction in which the exothermic resistor and the bridge circuit of a constant temperature control circuit are separately provided, similar effects can be obtained by detecting the potential difference of the bridge and adding the voltage limiting circuit of the invention to the exothermic resistor. Although the limitation of the voltage has been described in the embodiment, similar effects can be also obtained by limiting the current which is supplied to the bridge.

Figure 7:
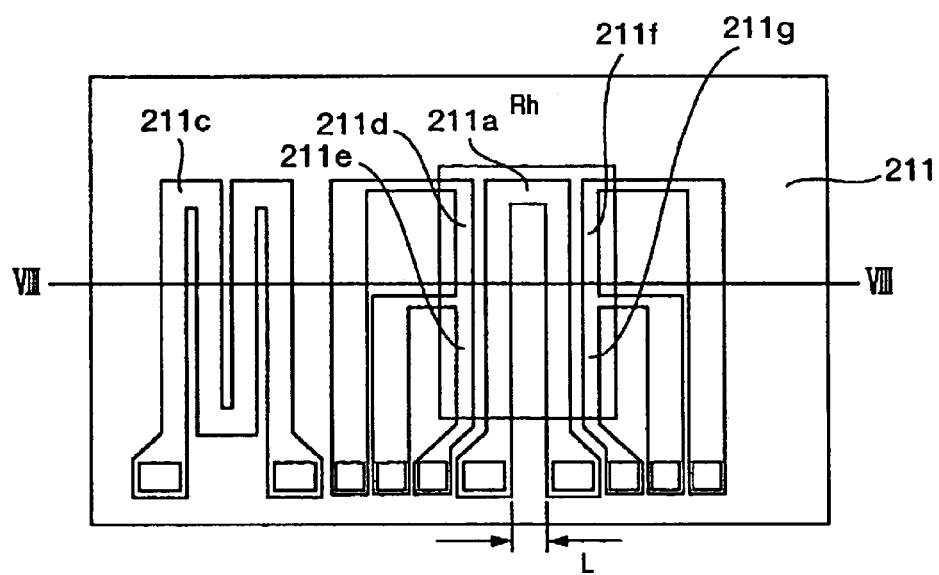
FIG. 7 is a diagram of an example showing a pattern of a resistor formed on a silicon substrate.
Figure 8:
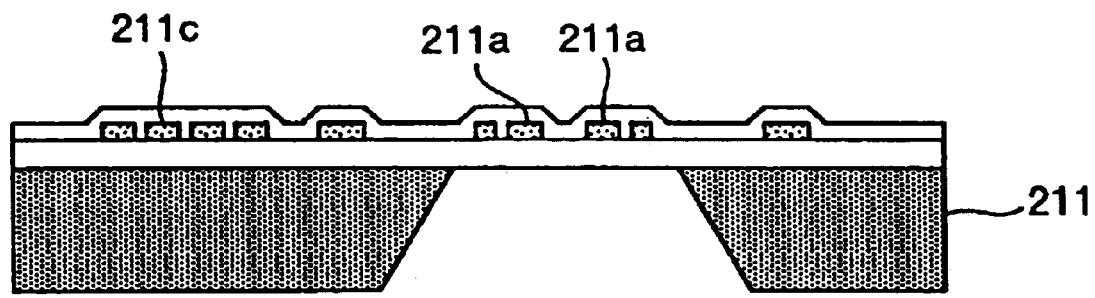
FIG. 8 is a cross sectional view of an example of the resistor formed on the silicon substrate.

FIG. 7 shows an example of a pattern in the case where the exothermic resistor 11 which is used is constructed by forming a thin film onto the silicon semiconductor substrate. An exothermic resistor 211a is vertically elongated, has a pattern in which a resistor is turned back, and has a structure in which resistors 211d, 211e, 211f, and 211g for detecting a temperature are arranged on both sides of the pattern. Each of the exothermic resistor 211a and the temperature detecting resistors 211d, 211e, 211f, and 211g is formed, for example, by arranging a resistor onto a diaphragm structure portion having a small heat capacity etched from the back side of a silicon substrate. A temperature compensation resistor 211c is arranged at a location where it is hardly influenced by the temperature by the heating of the exothermic resistor 211a. Dimensions of the diaphragm in case of reducing the heat capacity are set such that, for example, a length in the vertical direction lies within a range from 1.8 $\mu$m to 3 $\mu$m, a width lies within a range from 0.5 $\mu$m to 0.8 $\mu$m, and a thickness lies within a range from 1 $\mu$m to 3 $\mu$m. By setting the dimensions as mentioned above, the heat capacity is small and a strength of the diaphragm can be easily assured. FIG. 8 shows a cross sectional structure taken along the line VIII—VIII of the exothermic resistor in FIG. 7. The diaphragm has a structure such that a thickness of the place where the resistor pattern exists is largest. It is considered that a size of waterdrop having a possibility that it is deposited onto the exothermic resistor through an air filter of an automobile is usually smaller than a size (for example, 20 μm) of a mesh of the air filter. However, in the case where a dew condensation due to a sudden temperature change or the waterdrop formed via the filter is collected by some form in accordance with a shape or the like of the filter and grows, it is considered that the waterdrop of a size of up to about several ml is deposited. For example, in the diaphragm according to the foregoing example, when a waterdrop of 1 ml is deposited, it is considered that it covers an area in a range from about ⅕ to ½ of the exothermic resistor of the diaphragm. In such a case, an air bubble is more easily produced by the burn-out.

Figure 9:
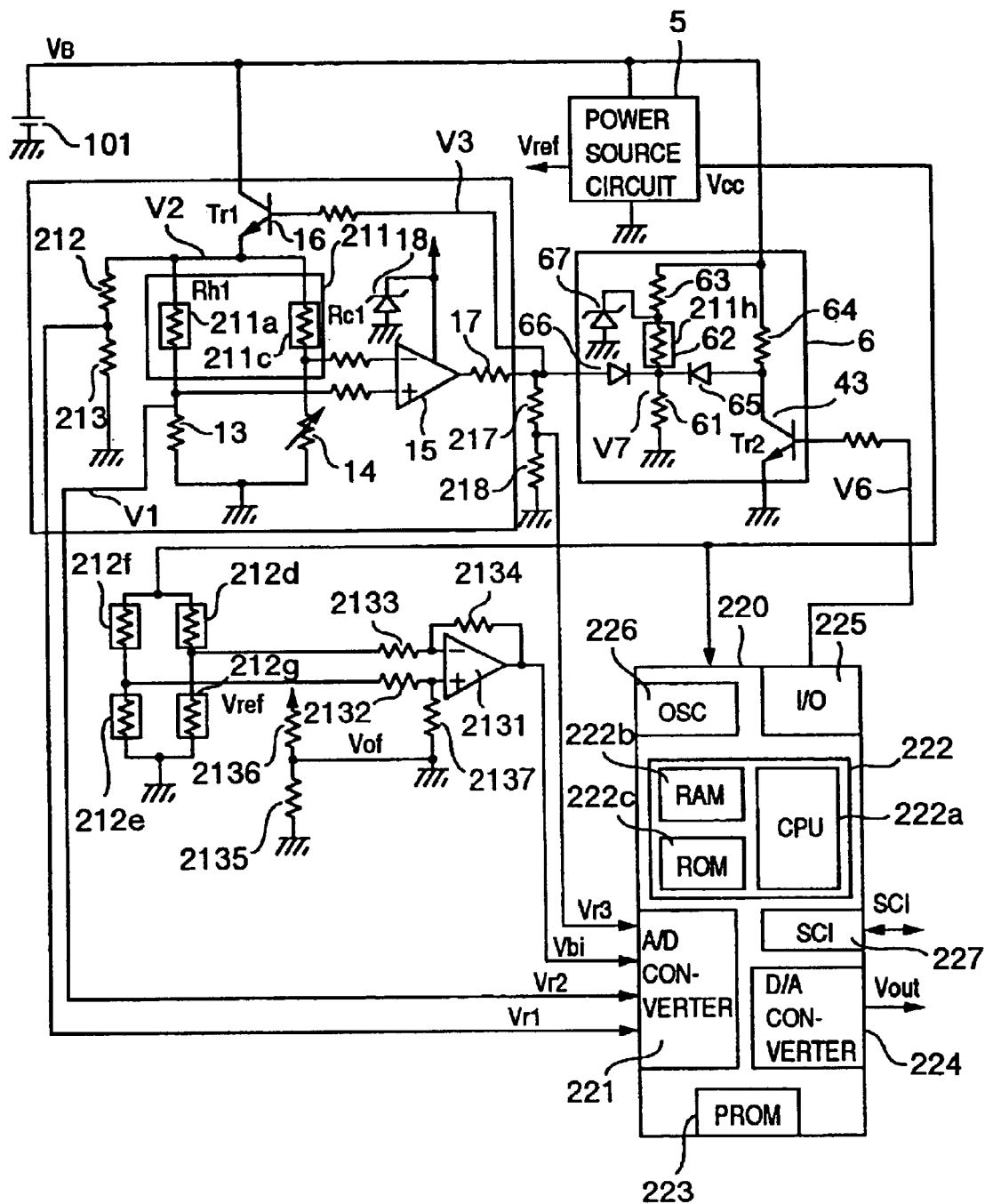
FIG. 9 is a circuit diagram showing an example of a hot-wire type air flow meter according to the second embodiment of the invention.

FIG. 9 shows the second embodiment in case of using such a resistor pattern. The hot wire driving circuit 1 is constructed in such a manner that a current flowing in the exothermic resistor 211a is adjusted by the differential amplifier 15 and transistor 16 so that the potential difference at the middle point of the bridge is equal to zero by a hoisten-bridge circuit constructed by the exothermic resistor 211a, temperature compensation resistor 211c, and resistors 13 and 14.

The resistors 211d, 211e, 211f, and 211g for detecting a temperature construct a bridge circuit by applying a voltage Vcc to a power source circuit 5. As a voltage which is applied to the bridge circuit, it is also possible to form a ratio metric construction using an external voltage. This differential voltage is amplified by a differential amplifier 2131 and resistors 2132, 2133, 2134, and 2137 around a virtual zero point voltage V of, as a center, obtained by dividing a reference voltage Vref by resistors 2135 and 2136. Although the temperature detecting resistors 211d, 211e, 211f, and 211g detect the heating temperature of the exothermic resistor 211a, since a temperature distribution becomes uniform in the case where there is no air flow, an output Vbi of the differential amplifier 2131 is equivalent to the virtual zero point voltage V of. When an air flow occurs here, by arranging the exothermic resistor 211a so that its longitudinal direction is perpendicular to the direction of the air flow, a temperature difference occurs between the resistors 211d and 211e and the resistors 211f and 211g, so that a flow rate signal according to the direction of the flow can be obtained as an output Vbi of the differential amplifier 2131.

In the embodiment, particularly, the output Vbi of the differential amplifier 2131 is inputted to an analog/digital converter 221 of a microcomputer 220, a variation or the like of an output sensitivity is adjusted as a digital amount by an arithmetic operation, and a resultant signal is sent to an engine control unit or the like as an output voltage Vout of a digital/analog converter 224. The microcomputer 220 is constructed by: an arithmetic operating circuit 222 comprising a CPU 222a and memories, for example, an RAM 222b and an ROM 222c; an oscillator (OSC) 226; an input/output (I/O) unit 225; a memory, for example, a PROM 223; and the like. It is sufficient to use a memory which can record a variation or the like of an output sensitivity of each sensor as an adjustment value one or more times as a PROM 223. The PROM 223 is not limited only to an electrically writable EEPROM, a flash ROM, or the like.

Voltages Vr1 and Vr2 at both ends of the exothermic resistor 211a, an output Vr3 of the differential amplifier 15, and the output Vbi of the differential amplifier 2131 are inputted to the analog/digital converter 221 of the microcomputer 220. In the microcomputer 220, the heating state of the exothermic resistor 211a is detected by obtaining the heating temperature by an arithmetic operation from the voltages Vr1 and Vr2 at both ends of the exothermic resistor 211a, an NPN transistor 43 is turned on by the output V6 of the I/O unit 225, and the heating state of the exothermic resistor 211a is limited by the voltage limitation switching circuit 6. Particularly, an SCI (Serial Communication Interface) 227 for communicating with the engine control unit or the like is provided for the microcomputer 220.

The voltage limitation switching circuit 6 is constructed by: the resistors 61 and 63 serially connected between the battery voltage VB of the power source 101 and the ground; the Zener diode 67 connected to a node of a resistor 211h (62) and the resistor 63; the diodes 65 and 66 connected to a node of the resistors 61 and 62; a resistor 64 connected to the battery voltage VB; the NPN transistor 43; and the like. The resistor 211h can be constructed in a manner similar to the temperature compensation resistor 211c.

The voltage limitation switching circuit 6 limits the output V3 of the differential amplifier 15 to a voltage which is set by the Zener diode 67 via the diode 66 and resistor 62. Since the NPN transistor 43 is OFF in the normal operation, the diode 65 is connected to the battery of the power source 101 via the resistor 64. Thus, in the normal operation, the output V3 of the differential amplifier 15 is not subjected to the voltage limitation. On the other hand, by detecting the heating temperature of the exothermic resistor and discriminating the heating state, the NPN transistor 43 is turned on and the output V3 of the differential amplifier 15 can be limited to the voltage set by the Zener diode 67 via the diode 66 and resistor 62.

Figure 10A:
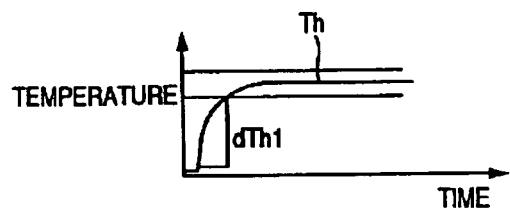
Figure 10D:
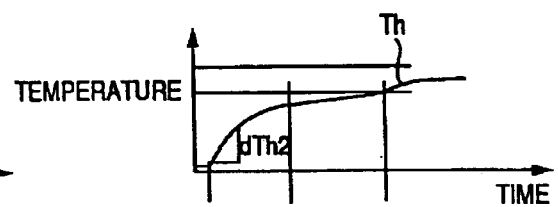
Figure 10B:
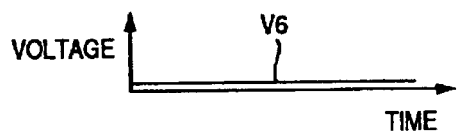
Figure 10E:
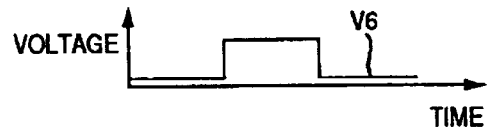
Figure 10C:
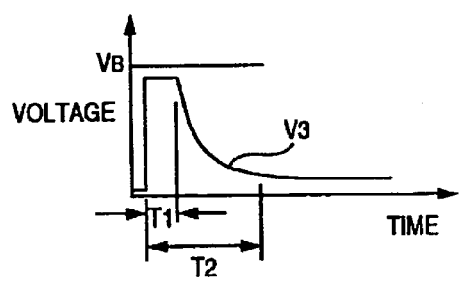

The details of the second embodiment will now be described with reference to FIGS. 10A to 10F. It corresponds to a case where the exothermic resistor 211a is heated from the ordinary temperature and the constant temperature control of about 200° C. is made as in case of turning on the power source. The case of the normal operation in FIGS. 10A to 10C will be described. When the maximum current which is limited by the battery voltage VB flows in the exothermic resistor 211a, the exothermic resistor 211a is rapidly heated (FIG. 10A). A resistance value Rh1 increases due to the temperature elevation, the bridge circuit is balanced, and the output V3 of the differential amplifier 15 decreases (FIG. 10C). The time T1 during which the maximum current flows in the exothermic resistor 211a is determined only by the resistance value Rh1 and heat capacity of the exothermic resistor 211a and the battery voltage VB in the ordinary case. The smaller the heat capacity is, the shorter the time T1 is. The microcomputer 220 monitors an exothermic temperature Th of the exothermic resistor 211a, thereby detecting a temperature change dth1 (FIG. 10A) per predetermined time. When the temperature change dth1 per predetermined time is larger than a predetermined value or when the exothermic temperature Th of the exothermic resistor 211a enters a target heating temperature range, the operation is regarded as a normal operation and the output V6 of the I/O unit 225 is held at the low level.

Figure 10F:
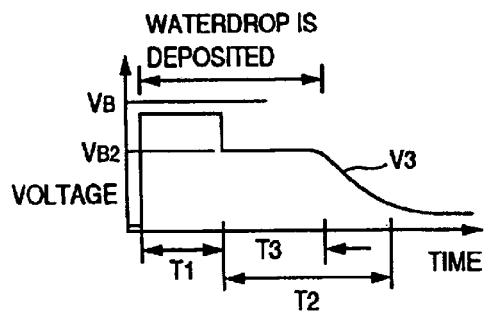

The case of the voltage limiting operation in FIGS. 10D to 10F will now be described. In the exothermic resistor 211a of a small heat capacity, particularly, if a substance which absorbs the heat generation of a fouling, water, or the like is deposited onto the exothermic resistor portion, an apparent heat capacity increases and the exothermic temperature Th slowly increases until the fouling, water, or the like is volatilized (FIG. 10D). The maximum current continuously flows in the exothermic resistor 211a. In this instance, a portion which locally becomes a high temperature in the exothermic resistor 211a appears depending on the depositing state of the fouling, water, or the like, and there is a possibility that the resistor formed on the thin film deteriorates or the breakage of the thin film is caused by a thermal shock. Therefore, the microcomputer 220 monitors the exothermic temperature Th of the exothermic resistor 211a, thereby detecting a temperature change dth2 (FIG. 10D) per predetermined time. When the temperature change dth2 per predetermined time is smaller than a predetermined value and when the exothermic temperature Th of the exothermic resistor 211a is equal to or less than the target heating temperature range, the operation is regarded as a voltage limiting operation and the output V6 of the I/O unit 225 is changed from the low level to the high level and held at the high level for a predetermined time (FIG. 10E). Thus, the NPN transistor 43 is turned on and the voltage V3 to be applied to the bridge circuit can be reduced to VB2 (FIG. 10F). When the applied voltage V3 to the bridge circuit decreases, the exothermic temperature Th of the exothermic resistor 211a slowly rises. By decreasing the voltage, the burn-out state can be prevented and the sudden increase or decrease in temperature can be prevented. A discriminating level of the temperature can be freely set in the microcomputer 220. When a heating limit time T3 elapses, the waterdrop is evaporated, the output V6 is changed from the high level to the low level, the NPN transistor 43 is turned off, and the operation is returned to the normal operation. Although the time T2 which is required until the output V3 of the differential amplifier 15 is finally stabilized becomes long by the execution of the voltage limiting operation, the deterioration or breakage of the resistor due to the sudden heating temperature change can be prevented, and the time T2 can be reduced to a time shorter than that which is required when the exothermic resistor 211a of a large heat capacity is used. Such a voltage limitation operating state apparently becomes a dead zone of the sensor and cannot be distinguished. However, by using the microcomputer 220, information showing that the voltage limitation operating state due to the deposition of the waterdrop corresponds to the protecting operation of the sensor and is a special state instead of a failure of the sensor is sent to the engine control unit or the like as an upper computer as diagnosis information of the sensor (an analog signal at the High or Low level, a digital signal such as an SCI [Serial Communication Interface], or the like), thereby enabling an erroneous operation or the like on the engine control to be prevented.

Figure 11:
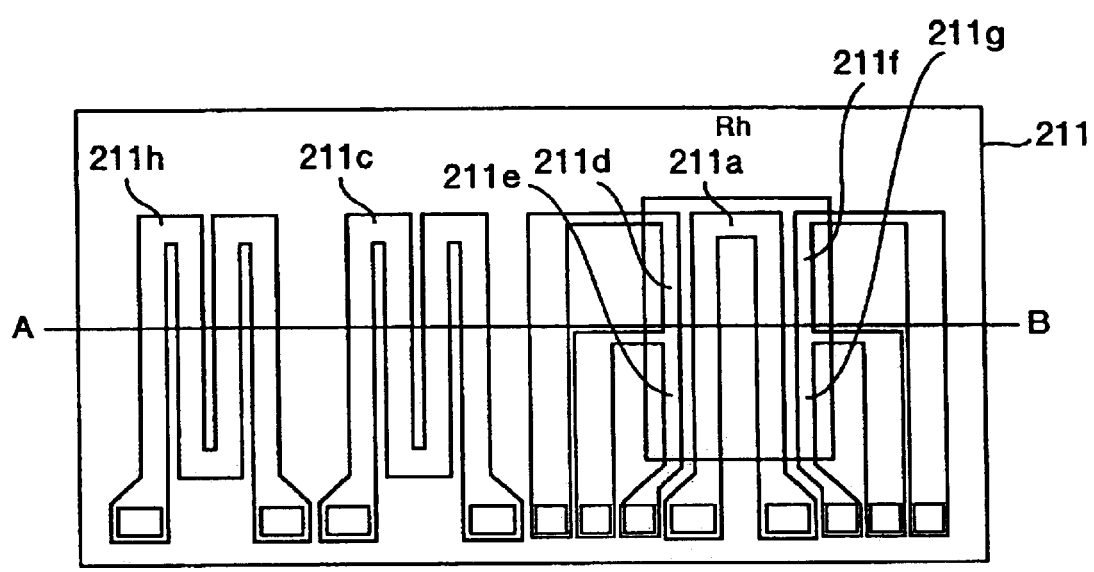
FIG. 11 is a diagram showing an example of a pattern of a resistor formed on a silicon substrate.

As described in the above embodiment, by setting the resistor 211h to a resistor having a similar temperature coefficient arranged on the same substrate as that of the temperature compensation resistor 211c as shown in FIG. 11, the temperature characteristic can be also provided for the limiting voltage.

According to the embodiment, particularly, in case of using the exothermic resistor of a small heat capacity, the heating state of the exothermic resistor can be accurately monitored. By finely limiting the heating state, there are effects such that the deterioration or breakage of the resistor can be prevented and the reliability of the hot-wire type air flow meter can be improved for a long time.

Figure 12:
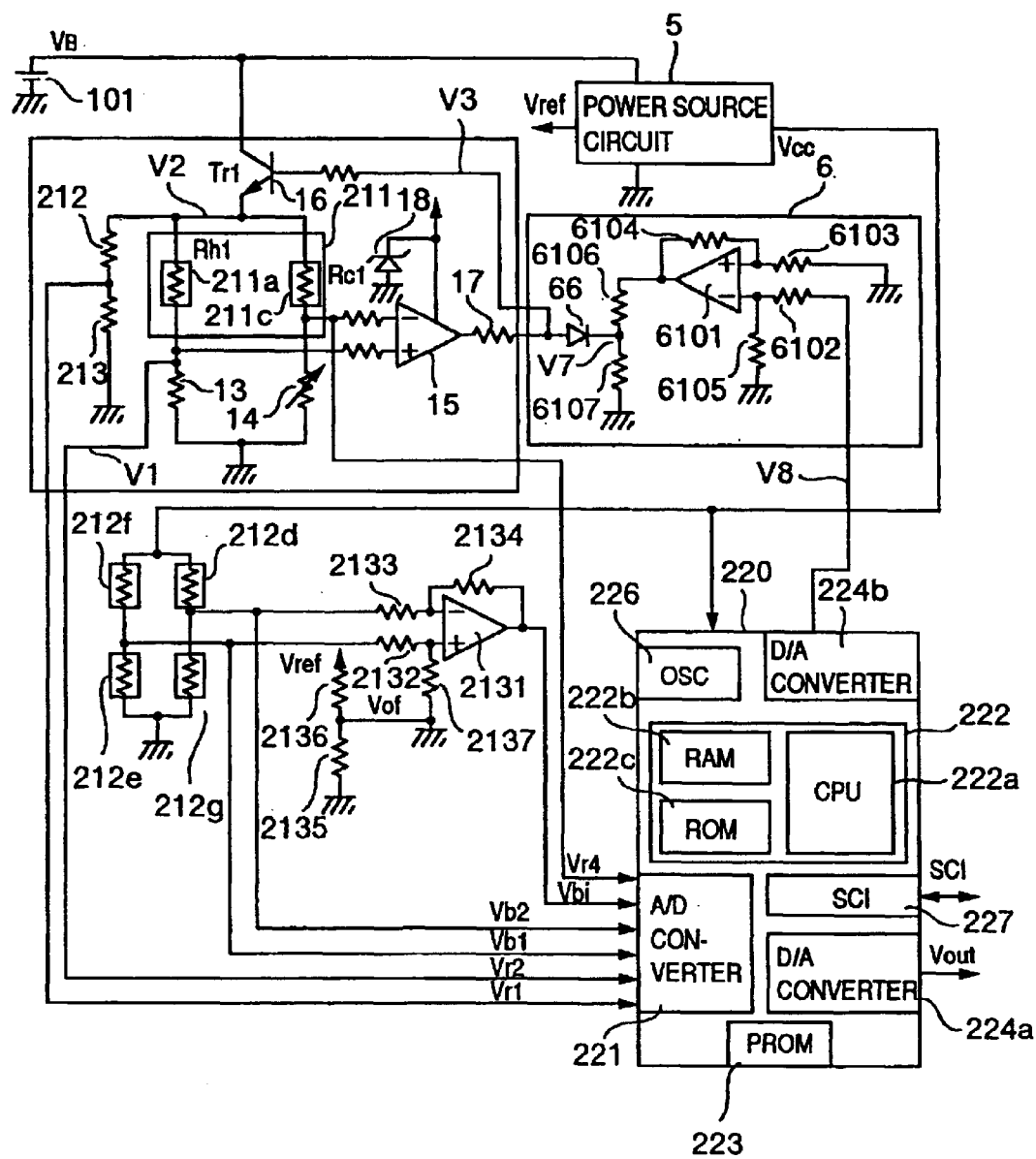
FIG. 12 is a circuit diagram showing an example of a hot-wire type flow meter according to the third embodiment of the invention.

The third embodiment of the invention will be described with reference to FIG. 12. In the embodiment, in a manner similar to FIG. 9, the hot wire driving circuit 1 is constructed in such a manner that a hoisten-bridge circuit is constructed by the exothermic resistor 211a, temperature compensation resistor 211c, and resistors 13 and 14, and a current flowing in the exothermic resistor 211a is adjusted by the differential amplifier 15 and transistor 16 so that the potential difference at the middle point of the bridge is equal to zero by the hoisten-bridge circuit. A resistor 211 is constructed by forming a thin film onto the silicon semiconductor substrate.

The voltages Vr1 and Vr2 at both ends of the exothermic resistor 211a, a voltage Vr4 of the temperature compensation resistor 211c, and the output Vbi of the differential amplifier 2131 are inputted to the analog/digital converter 221 of the microcomputer 220. In the microcomputer 220, the heating temperature of the exothermic resistor 211a is obtained by an arithmetic operation from the voltages Vr1 and Vr2 at both ends of the exothermic resistor 211a, and a suction temperature is obtained by an arithmetic operation from the voltages Vr4 and Vr1 of the temperature compensation resistor 211c, thereby detecting the ambient temperature (suction temperature) and the heating state of the exothermic resistor 211a. Further, the heating state of the exothermic resistor 211a is limited by the voltage limitation switching circuit 6 in accordance with an output VB of a digital/analog converter 224b. In the voltage limitation switching circuit 6, a differential amplifier 6101 for amplifying the output V8 of the digital/analog converter 224b is connected to the ground by network resistors 6102, 6103, 6104, and 6105 and resistors 6106 and 6107 for dividing the output voltage. In a manner similar to the foregoing embodiment, in the voltage limitation switching circuit. 6, the output V3 of the differential amplifier 15 is limited to an output of the differential amplifier 6101 which is set by the output V8 of the digital/analog converter 224b via the diode 66 and resistor 6106.

In the normal operation, the output of the differential amplifier 6101 is generated as a maximum value. Thus, the output V3 of the differential amplifier 15 is not subjected to the voltage limitation in the normal operation. On the other hand, by detecting the heating temperature and suction temperature of the exothermic resistor 211a and discriminating the heating state, the output V8 of the digital/analog converter 224b is set in accordance with the suction temperature. The output V3 of the differential amplifier 15 can be digitally and freely limited to the voltage which has already been set via the diode 66 and resistor 6106.

Similarly, in case of using the structure such that the temperature detecting resistors 211d, 211e, 211f, and 211g are arranged on both sides of the exothermic resistor 211a, the local heating temperature of the exothermic resistor 211a can be also measured by intermediate voltages Vb1 and Vb2 between the temperature detecting resistors 211e and 211f and between the temperature detecting resistors 211g and 211d. Usually, when a waterdrop is deposited onto the exothermic resistor 211a heated to 100° C. or higher, the temperatures of the temperature detecting resistors 211d, 211e, 211f, and 211g are changed in accordance with the depositing state, respectively. For example, the fundamental depositing state of the waterdrop is discriminated by the heating temperature of the exothermic resistor 211a. In this instance, the size or the like of the waterdrop can be discriminated by observing the temperature changes of the temperature detecting resistors 211d, 211e, 211f, and 211g. The time which is required until there is no waterdrop is presumed and the time corresponding to the dead zone of the sensor is sent to the engine control unit. On the basis of it, the state of the sensor is discriminated, the output of the sensor is temporarily lightened and used for control or the like. Thus, a use efficiency of the sensor is improved and the engine control can be more finely made.

According to the embodiment, particularly, in case of using the exothermic resistor of the small heat capacity, the heating state of the exothermic resistor can be accurately monitored. By finely limiting the heating state, there are effects such that the deterioration or breakage of the resistor can be prevented, the reliability of the hot-wire type air flow meter can be improved more for a long time, and matching performance with the engine system is improved.

Figure 13:
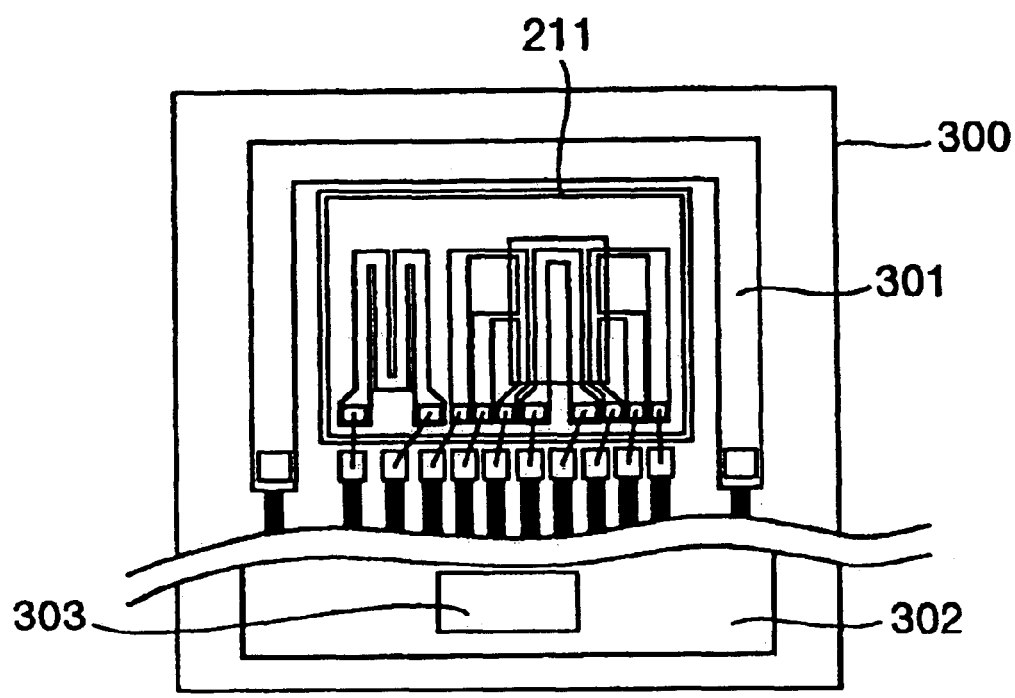
FIG. 13 is a diagram showing a state where a resistor formed on a silicon substrate is mounted on a circuit board.

Subsequently, FIG. 13 shows an example in the case where the resistor 211 constructed by forming a thin film onto the silicon semiconductor substrate is mounted on, for example, a multilayer ceramic substrate or the like. The resistor 211 on the silicon substrate is mounted in a shaved frame of a ceramic substrate 300 and connected to a patterned circuit 302 on the ceramic substrate 300 via an electrode pad. Besides, an IC 303 obtained by integrating a circuit and a heater (second resistive exothermic element) 301 for heating of the ceramic substrate 300 are provided on the silicon substrate 300. The heater 301 for heating is arranged so as to surround the resistor 211 on the silicon substrate and controlled in accordance with the heating state of the first exothermic resistor 211a on the ceramic substrate. Although the second resistive exothermic element 301 can be provided around the first exothermic resistor 211a on the silicon substrate, it is desirable to provide it outside of the diaphragm so that the whole resistor 211 on the ceramic substrate can be heated. By heating the peripheral portion of the first exothermic resistor 211a in accordance with circumstances as mentioned above, when a waterdrop is deposited, the time which is required until the waterdrop in the portion other than the diaphragm is eliminated can be shortened. The ambient temperature is detected and, in case of a low temperature, the whole resistor 211 on the silicon substrate is first preheated by the second resistive exothermic element 301. Thus, for example, the heating time of the first exothermic resistor 211a at the time when an ice is deposited can be remarkably reduced. Particularly, it is effective in the case where the electric power which is supplied to the first exothermic resistor 211a is limited so as not to break the diaphragm.

According to the embodiment, by controlling the heating temperature of the second resistive exothermic element in accordance with the ambient temperature, the time of the dead zone of the hot-wire type air flow meter due to the limitation of the heating state can be reduced without breaking the first exothermic resistor 211a on the diaphragm.

There is an effect such that the performance can be improved while assuring the reliability as mentioned above.

Figure 14:
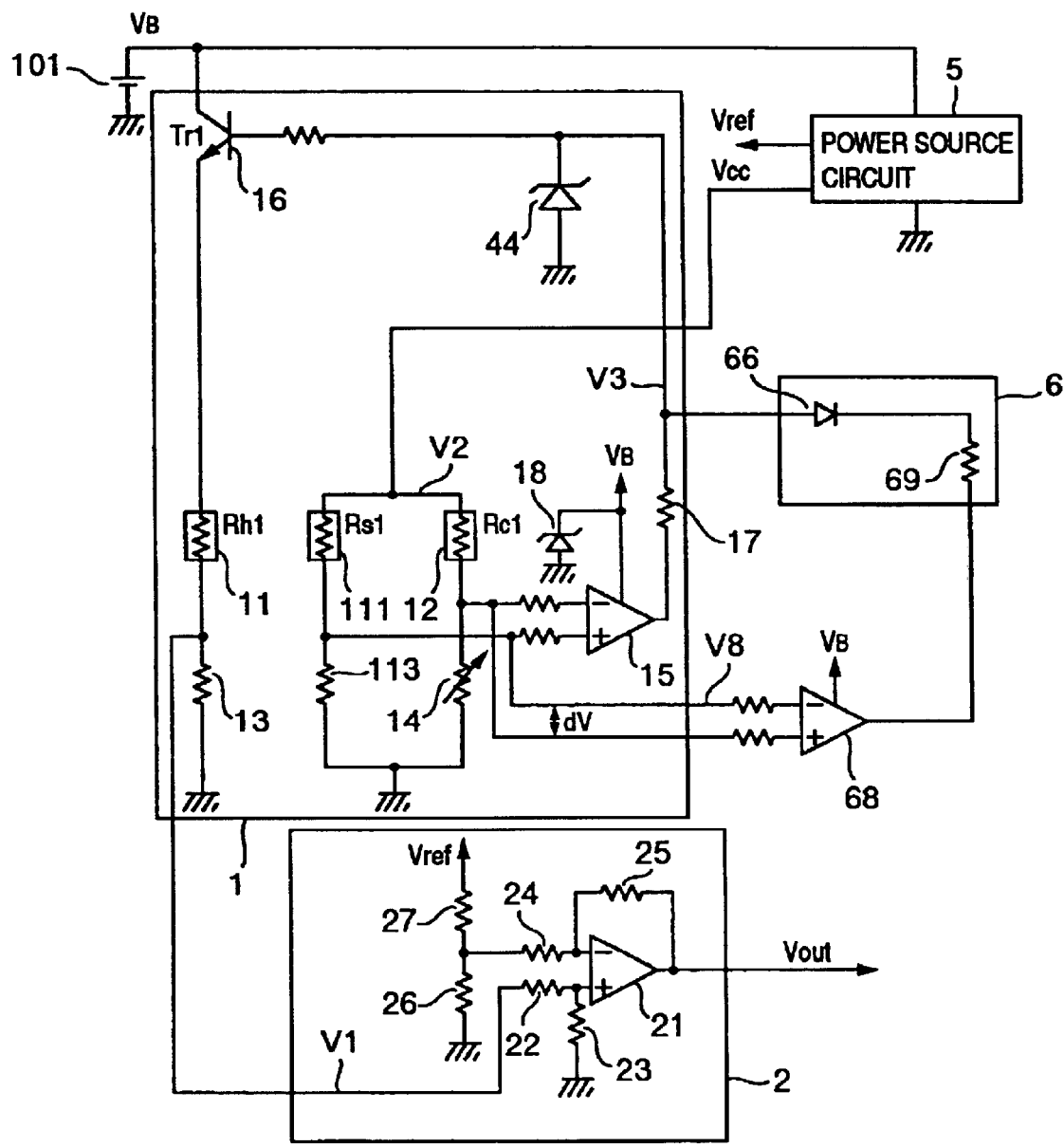
FIG. 14 is a circuit diagram showing an example of a hot-wire type flow meter according to the fourth embodiment of the invention.

The third embodiment of the invention will now be described with reference to FIG. 14. A hoisten-bridge circuit based on the constant voltage Vcc driving is constructed by: the exothermic resistor 11; a heating portion of the current detecting resistor 13; a temperature detecting resistor (heating temperature sensor) 111 arranged on the side of the exothermic resistor 11 so as to be mounted on the same substrate as that of the exothermic resistor 11; the temperature compensation resistor 12; and the resistors 13 and 14. The hot wire driving circuit 1 is constructed in such a manner that a current flowing in the exothermic resistor 11 is adjusted by the differential amplifier 15 and transistor 16 so that the potential difference at the middle point of the bridge is equal to zero by the hoisten-bridge circuit. When the heating temperature of the exothermic resistor 11 is low, the output of the differential amplifier 15 increases and the apparatus operates so as to heat more. With this construction, the resistance value of the exothermic resistor 11 is controlled so as to be constant, namely, the temperature is set to a predetermined value irrespective of the air flow rate. In this instance, the signal corresponding to the air flow rate by the exothermic resistor 11 is inputted to the zero span circuit 2. The zero span circuit 2 is constructed by the differential amplifier 21 and resistors 22, 23, 24, 25, 26, and 27. The above construction is a mere example and a system for detecting the flowing direction by using the temperature difference as described above can be also used as output means of the signal corresponding to the air flow rate.

Particularly, the differential amplifier 68 is prepared as second bridge detecting means for detecting the potential difference at the middle point of the bridge in order to detect the depositing state of the waterdrop, and the simplified voltage limitation switching circuit 6 is provided as a second limiter for limiting the output voltage V3 of the differential amplifier 15 in accordance with a detection result.

The simplified voltage limitation switching circuit 6 is constructed by the diode 66, a resistor 69, and the like. The output of the differential amplifier 15 is connected to the output of the differential amplifier 68 through the resistor 17, diode 66, and resistor 69. The voltage to be limited is determined by a voltage dividing ratio of the resistors 17 and 69.

Even in such a construction in which the heating unit and the bridge circuit of the constant temperature control are separately provided, effects similar to those in the above embodiment can be obtained by detecting the depositing state of the waterdrop and limiting the voltage in accordance with the output state of the differential amplifier 68 in a manner similar to the above embodiment.

According to the embodiment, since the applied voltage to the exothermic resistor can be limited by the simple circuit construction, there is such an effect that the reduction of the reliability such as deterioration or breakage of the resistor can be prevented by low costs.

Even in case of controlling the applied voltage V2 of the bridge by the pulse driving, an effect similar to the effect which is obtained by the linear voltage control described in the embodiment so far can be obtained. For example, by limiting either the applied voltage V2 to the bridge or the driving current to the predetermined value and by limiting the pulse width corresponding to the magnitude of the limited voltage (or current) to a predetermined value, the deterioration or the like of the resistor due to the overheating can be prevented.

Although not shown, as another embodiment, there is an internal combustion engine constructed by: a suction pipe in which the air including liquid droplets flows; an air flow meter having a protecting circuit in the case where the liquid is deposited to a detecting device; a fuel injection valve; and a controller for controlling the fuel injection valve on the basis of an output of the air flow meter.

According to the embodiment, particularly, in case of using the exothermic resistor of the small heat capacity, by preventing the maximum heating state from continuing in excess of the inherent heat capacity of the exothermic resistor, the deterioration or breakage of the resistor can be prevented and there is such an effect that the reliability of the hot-wire type air flow meter can be assured and, at the same time, the response speed upon activation of the air flow rate when the power source is turned on can be improved. Thus, there are such effects that the air flow rate at the start of the engine of the automobile can be rapidly measured and a quantity of exhaust gas at the time of start of the engine can be reduced.

According to the embodiment, particularly, in case of using the exothermic resistor of the small heat capacity, by distinguishing and detecting the case where a waterdrop, an oil droplet, or the like is deposited onto the exothermic resistor portion and the normal case where there is no deposition, there are such effects that the heating state is limited only in the case where the waterdrop, oil droplet, or the like is deposited on the exothermic resistor portion without narrowing the inherent measuring range of the flow rate, the deterioration of the resistor can be prevented, and the reliability of the hot-wire type air flow meter can be assured and, at the same time, the response speed in response to the leading edge of the air flow rate when the power source is turned on can be improved. There are, consequently, such effects that the air flow rate at the start of the engine of the automobile can be rapidly measured, and a quantity of exhaust gas at the start of the engine can be reduced.

What is claimed is:

1. A hot-wire type air flow meter for an internal combustion engine, comprising:

an exothermic resistor film provided on a thin portion formed on a silicon substrate arranged in a suction pipe of the internal combustion engine and emits heat to an air through said resistor film; and a control circuit for controlling a voltage to be applied to said resistor film or a current to be supplied, said control circuit being configured such that, where a liquid droplet is deposited onto said resistor film, said applied voltage is controlled to a value smaller than a voltage which is applied to said resistor film at the time of measuring a maximum measuring of an air flow rate within said suction pipe when a liquid droplet is not deposited onto said resistor film range or said supply current is controlled to a value smaller than a current flowing in said resistor film at the time of measuring the maximum measuring range.

2. A meter according to claim 1, further comprising another exothermic resistor provided on said silicon substrate in a portion other than said thin portion.

3. A hot-wire type air flow meter for an internal combustion engine, comprising:

a first resistor film provided on a thin portion formed on a silicon substrate and arranged in a suction pipe of the internal combustion engine to emit heat to a measuring fluid through said first resistor film and a second resistor film whose resistance value changes in accordance with an ambient temperature; and a control circuit which has a bridge circuit including said second resistor film and controls a voltage to be applied to said first resistor film or a current to be supplied, said control circuit being configured such that, where an output of said bridge circuit is larger than a specified value, said applied voltage is controlled to be smaller than a voltage which is applied to said first resistor film when measuring a maximum measuring range of an air flow rate within said suction pine when a liquid droplet is not deposited onto such first resistor film or said supply current is controlled to a value smaller than a current flowing in said first resistor film when measuring the maximum measuring range.

4. A meter according to claim 3, further comprising another exothermic resistor provided on said silicon substrate in a portion other than said thin portion.

5. A hot-wire type air flow meter for an internal combustion engine, comprising:

an exothermic resistor arranged in a measuring fluid and emitting heat to a measuring fluid;

a control circuit for controlling a voltage to be applied to said resistor or a current to be supplied;

first limiting means for limiting said applied voltage or said supplied current to a value which is equal to or less than a first value; and second limiting means for limiting said applied voltage or said supplied current to a value which is equal to or less than a second value smaller than said first value, said control circuit being configured such that, in the case where a liquid droplet is deposited onto said resistor, said applied voltage or said supplied current is limited to a value which is equal to or less than said second value.

6. A meter according to claim 5, further comprising changing means for changing a predetermined value or said second value on the basis of a temperature of the liquid droplet or a measuring fluid.

7. A meter according to claim 5, further comprising changing means for changing said predetermined value or said second value on the basis of an output of a resistor which is arranged in said measuring fluid and whose resistance value changes in accordance with an ambient temperature.

8. A meter according to claim 7, wherein said changing means changes the value so as to reduce said predetermined value or said second value when said resistance value increases or changes the value so as to increase said predetermined value or said second value when said resistance value decreases.

9. A meter according to claim 5, wherein said exothermic resistor is a thin film resistor provided on a thin portion formed on a silicon substrate and arranged in a suction pipe of the internal combustion engine.

10. A meter according to claim 9, further comprising another exothermic resistor provided on said silicon substrate in a portion other than said thin portion.

11. A meter according to claim 10, wherein a heat generation of said another exothermic resistor is controlled independent of said exothermic resistor.

12. A hot-wire type air flow meter for an internal combustion engine, comprising:

an exothermic resistor arranged in a measuring fluid and emitting heat to said measuring fluid; and a control circuit for controlling a voltage to be applied to said resistor or a current to be supplied, said control circuit being configured such that, in the case where a liquid droplet is deposited onto said resistor, said control circuit controls said applied voltage or said supplied current so that a generation heat amount per unit area of said resistor is smaller than an amount of heat by which a burn-out occurs at an interface between said resistor and said liquid droplet.

13. A hot-wire type air flow meter for an internal combustion engine, comprising:

an exothermic resistor arranged in a measuring fluid and emitting heat to said measuring fluid; and a control circuit for controlling a voltage to be applied to said resistor or a current to be supplied, said control circuit being configured such that, in the case where a liquid droplet is deposited onto said resistors, said control circuit controls said applied voltage or said supplied current so that a generation heat amount per unit area of said resistor is smaller than a predetermined value.

14. A meter according to claim 13, wherein said predetermined value is equal to $4 \times 10^5$ W/m$^2$.

15. A meter according to claim 13, further comprising changing means for changing said predetermined value or said second value on the basis of a temperature of the liquid droplet or said measuring fluid.

16. A meter according to claim 13, further comprising changing means for changing said predetermined value or said second value on the basis of an output of a resistor which is arranged in said measuring fluid and whose resistance value changes in accordance with an ambient temperature.

17. A meter according to claim 16, wherein said changing means changes the value so as to reduce said predetermined value or said second value when said resistance value increases or changes the value so as to increase said predetermined value or said second value when said resistance value decreases.

18. A hot-wire type air flow meter for an internal combustion engine, comprising:
a first resistor which is arranged in a measuring fluid and generates heat emitted to said measuring fluid, and a second resistor whose resistance value changes in accordance with an ambient temperature;
a control circuit which has a bridge circuit including said second resistor and controls a voltage to be applied to said first resistor or a current to be supplied;
first limiting means for limiting said applied voltage or said supply current to a value which is equal to or less than a first value; and
second limiting means for limiting said applied voltage or said supply current to a value which is equal to or less than a second value smaller than said first value,
said control circuit being configured such that, in the case where an output of said bridge circuit is larger than a predetermined value, said control circuit limits said applied voltage or said supplied current to be equal to or less than said second value.

19. A meter according to claim 18, further comprising changing means for changing a predetermined value or said second value on the basis of a temperature of a liquid droplet or said measuring fluid.

20. A meter according to claim 18, further comprising changing means for changing a predetermined value or said second value on the basis of an output of a resistor which is arranged in said measuring fluid and whose resistance value changes in accordance with the ambient temperature.

21. A meter according to claim 20, wherein said changing means changes the value so as to reduce said predetermined value or said second value when said resistance value increases or changes the value so as to increase said predetermined value or said second value when said resistance value decreases.

22. A hot-wire type air flow meter for an internal combustion engine, comprising:
a first resistor which is arranged in a measuring fluid and generates heat emitted to said measuring fluid, and a second resistor whose resistance value changes in accordance with an ambient temperature, and
a control circuit which has a bridge circuit including said second resistor and controls a voltage to be applied to said first resistor or a current to be supplied, said control circuit being configured such that,
in the case where an output of said bridge circuit is larger than a certain value, said control circuit controls said applied voltage or said supplied current to a value which is smaller than a heat amount by which a burn-out occurs at an interface between said first resistor and a liquid droplet.

23. A hot-wire type air flow meter for an internal combustion engine, comprising:
a first resistor which is arranged in a measuring fluid and generates heat emitted to said measuring fluid, and a second resistor whose resistance value changes in accordance with an ambient temperature; and
a control circuit which has a bridge circuit including said second resistor and controls a voltage to be applied to an exothermic resistor or a current to be supplied, said control circuit being configured such that,
in the case where an output of said bridge circuit is larger than a certain value, said control circuit controls said applied voltage or said supplied current so that a generation head amount per unit area of said first resistor is smaller than a predetermined value.

24. A meter according to claim 23, wherein said predetermined value is equal to $4 \times 10^5$ W/m$^2$.

25. A meter according to claim 23, further comprising changing means for changing said predetermined value or said second value on the basis of a temperature of a liquid droplet or said measuring fluid.

26. A meter according to claim 23, further comprising changing means for changing said predetermined value or said second value on the basis of an output of a resistor which is arranged in said measuring fluid and whose resistance value changes in accordance with the ambient temperature.

27. A meter according to claim 26, wherein said changing means changes the value so as to reduce said predetermined value or said second value when said resistance value increases or changes the value so as to increase said predetermined value or said second value when said resistance value decreases.

28. A meter according to claim 25, wherein said changing means changes the value so as to reduce said predetermined value or said second value when said temperature increases and changes the value so as to increase said predetermined value or said second value when said temperature decreases.

29. A hot-wire type air flow meter for an internal combustion engine, comprising
an exothermic resistor arranged in a suction pipe of said internal combustion engine wherein heat is emitted to an air through said resistor;
a control circuit for controlling a voltage to be applied to said resistor or a current to be supplied; and
transmitting means for transmitting a specific signal to a control unit of said internal combustion engine in the case where a liquid droplet is deposited onto said resistor.

30. A meter according to claim 29, wherein said transmitting means transmits a signal including information regarding an amount of said deposited liquid droplet to the control unit of said internal combustion engine.

31. A meter according to claim 29, wherein said exothermic resistor is a thin film resistor provided on a thin portion formed on a silicon substrate and arranged in said suction pipe of said internal combustion engine.

32. A meter according to claim 29, further comprising another exothermic resistor provided on a silicon substrate in a portion other than said thin portion.

33. A meter according to claim 32, wherein a heat generation of said another exothermic resistor is controlled independent of said exothermic resistor.

* * * * *